Sept. 24, 1968     O. K. SCHWENZFEIER     3,402,611
GEAR ENGAGEMENT GUIDE MECHANISM FOR
GEAR-TYPE ORBITING-MASS OSCILLATOR
Filed Oct. 6, 1966     3 Sheets-Sheet 1
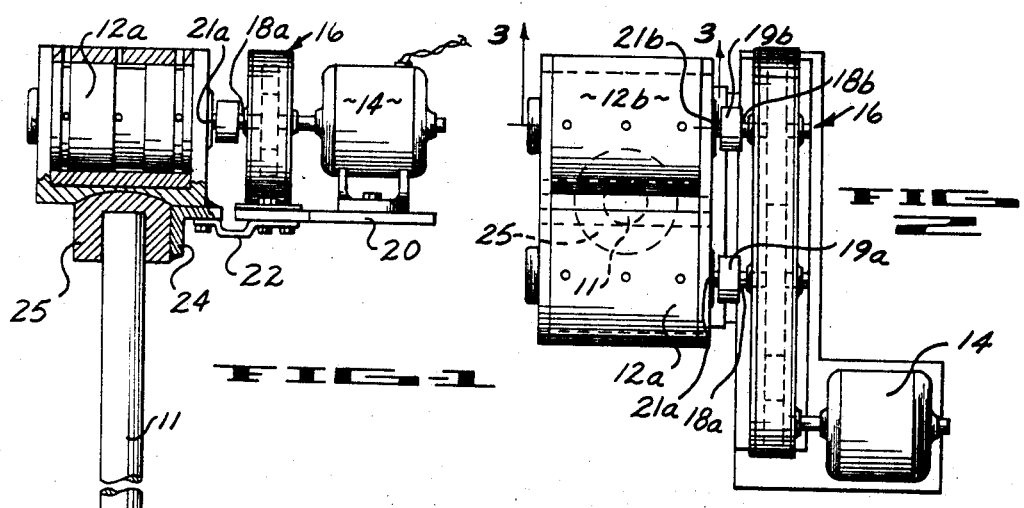
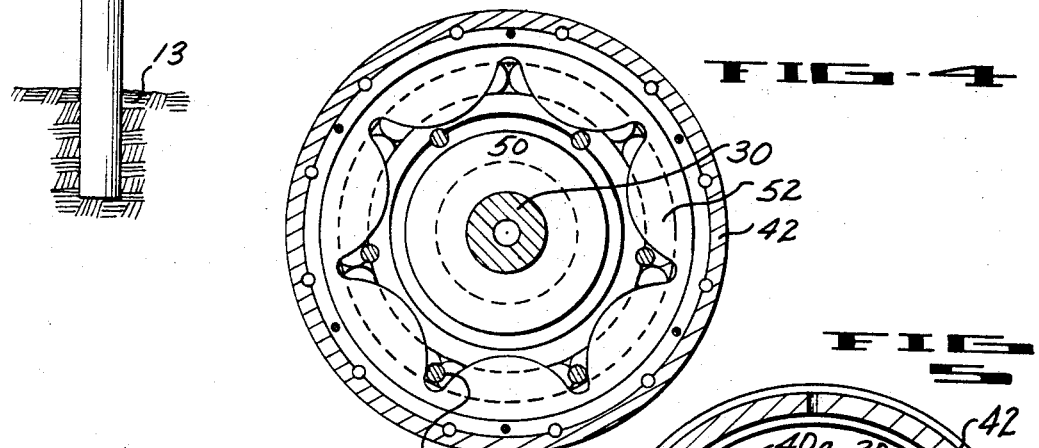
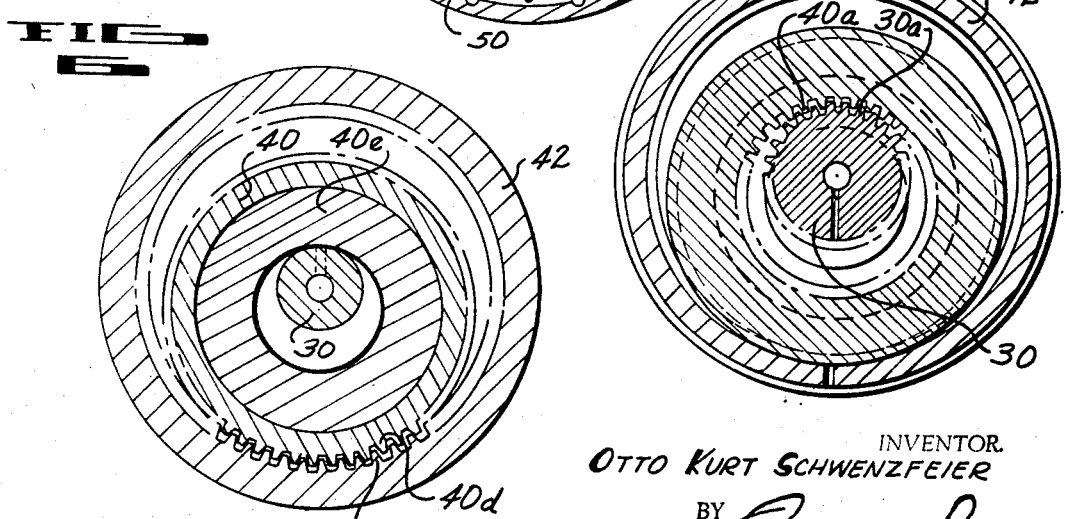
INVENTOR.
OTTO KURT SCHWENZFEIER
BY
ATTORNEY

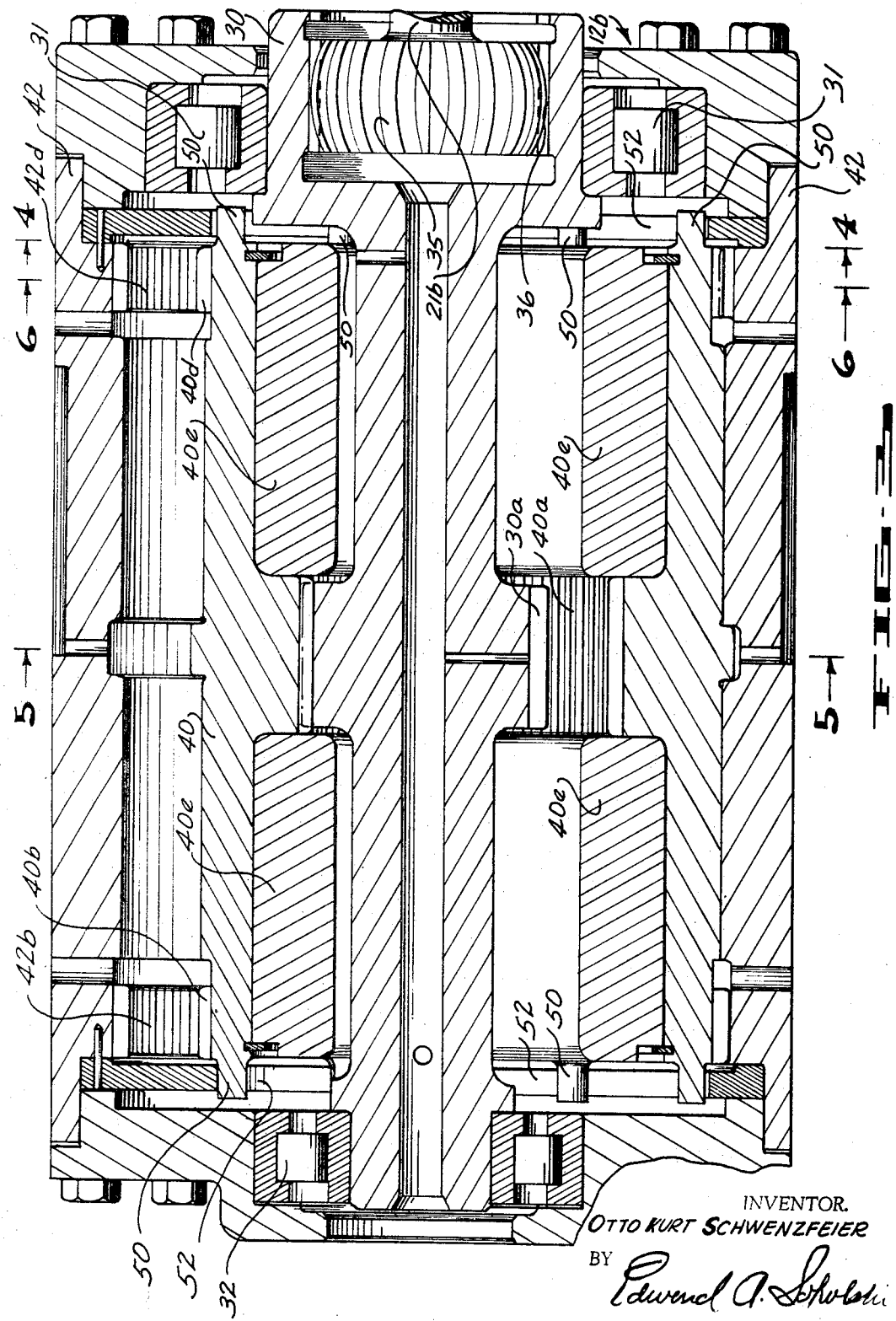

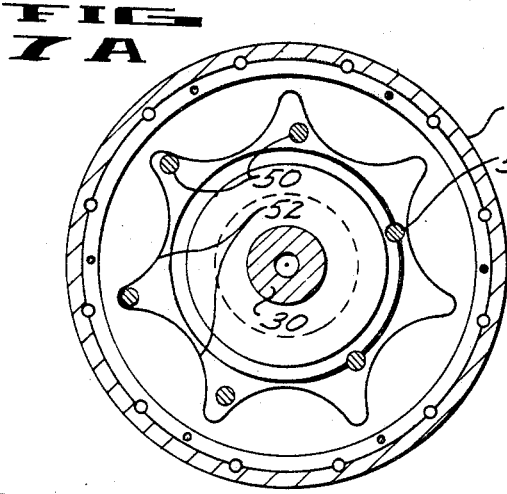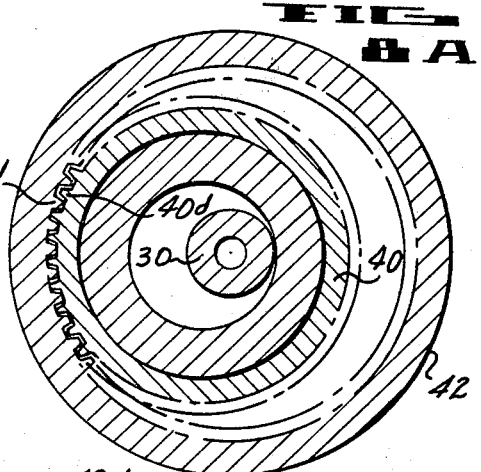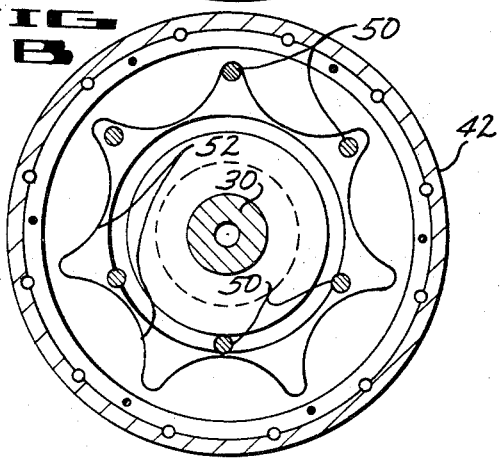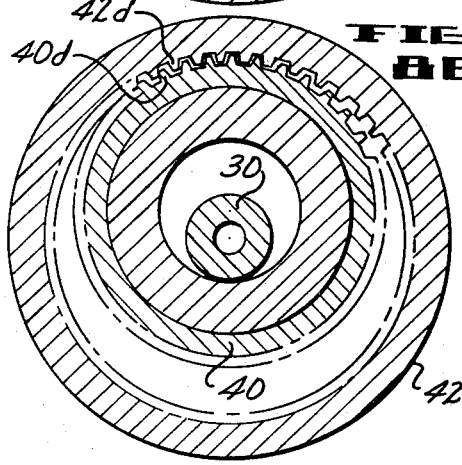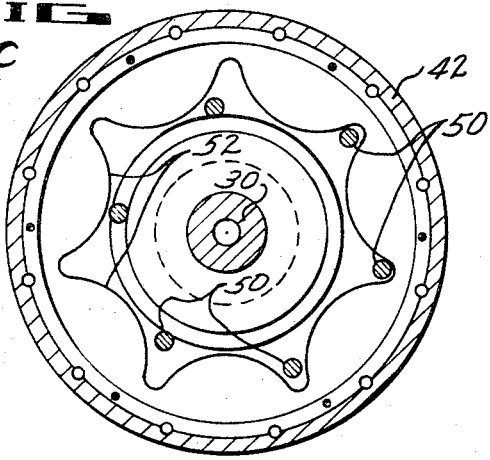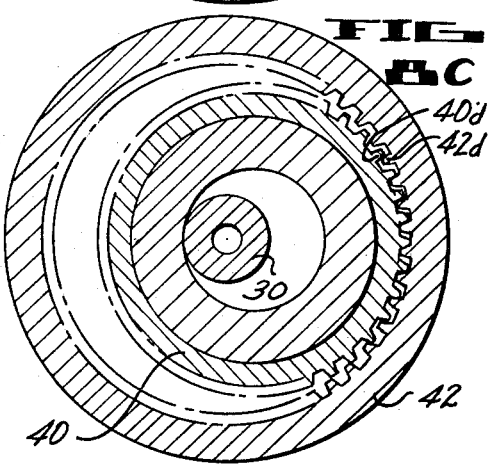
INVENTOR
Otto Kurt Schwenzfeier
BY Edward A. Sokolski
ATTORNEY

United States Patent Office 3,402,611
Patented Sept. 24, 1968

3,402,611
GEAR ENGAGEMENT GUIDE MECHANISM FOR GEAR-TYPE ORBITING-MASS OSCILLATOR
Otto K. Schwenzfeier, Chula Vista, Calif., assignor to Shell Oil Company, New York, N.Y., a corporation of Delaware
Filed Oct. 6, 1966, Ser. No. 584,859
7 Claims. (Cl. 74—61)

This invention relates to a gear engagement guide mechanism for gear-type orbiting-mass oscillators, and more particularly to such a mechanism which assures that the gears of such an oscillator are properly engaged at times when there is insufficient centrifugal force present to assure such engagement, as during the starting up and stopping of the oscillator rotor.

In generating sonic energy for use in operations, for example such as drilling, boring or driving members into earthen formations, orbiting-mass oscillators may be utilized which, by virtue of the rotation of their eccentric rotors, produce relatively high-level sonic energy. The rotor of this type oscillator may take the form of a cylindrical mass which is rotatably driven around a race formed in a housing member. This type of oscillator may utilize a gear ring on the rotor which engages a mating gear ring in the housing race. Such an oscillator is shown for example in Patent No. 3,194,326 issued July 13, 1965, to A. G. Bodine, Jr. With the oscillator rotor operating at normal operating speeds, the centrifugal force holds the gears in proper engagement. However, it has been found that during starting and stopping operations the gears tend to fall out of engagement with each other, often resulting in serious damage to the gear teeth.

The device of this invention provides simple yet highly effective means for assuring that the gears of a gear-type orbiting-mass oscillator are in proper engagement at all times, independent of rotor rotation. This end result is achieved in the device of the invention by means of a plurality of spaced pin elements which extend from the rotor along axes substantially parallel to the longitudinal axis thereof and which engage scalloped segments formed in an annular structure fixedly located relative to the rotor housing. There is one less pin element than scalloped segment and the pin elements and scalloped segments are arranged with respect to each other so that as the rotor rotates, it is held in its eccentric position against the wall of the housing with the rotor and housing gears being held in engagement with each other at all times. In this manner chattering and grinding of the gears, which was heretofore prevalent during starting and stopping, is prevented, with smooth operation being provided during such periods.

It is therefore an object of this invention to provide means for facilitating the starting and stopping of gear-type orbiting-mass oscillators.

It is a further object of this invention to provide simple yet highly effective means for holding the gears of a gear-type orbiting-mass oscillator in engagement under all types of operating conditions.

It is still another object of this invention to provide means for preventing damage to the gears of a gear-type orbiting-mass oscillator when the rotor of such oscillator is below normal operating speed.

Other objects of this invention will become apparent from the following description taken in connection with the accompanying drawings, of which:

FIG. 1 is an elevational view illustrating the device of the invention as incorporated into an earth boring system;

FIG. 2 is a top plan view of the system illustrated in FIG. 1;

FIG. 3 is a cross-sectional view taken along the plane indicated by 3—3 in FIG. 2;

FIG. 4 is a cross-sectional view taken along the plane indicated by 4—4 in FIG. 3;

FIG. 5 is a cross-sectional view taken along the plane indicated by 5—5 in FIG. 3;

FIG. 6 is a cross-sectional view along the plane indicated by 6—6 in FIG. 3; and FIGS. 7a–7c and 8a–8c are a series of cross-sectional views of the guide mechanism and gears of the device of the invention illustrating the operation of device of the invention to guide gear engagement at various rotational positions.

Referring now to FIGS. 1 and 2, a sonic boring system incorporating the device of the invention is illustrated. Casing member 11 is being driven into earthen material 13 by virtue of the sonic energy imparted thereto by orbiting-mass oscillators 12a and 12b. Orbiting-mass oscillators 12a and 12b, to be described more fully in connection with FIG. 3, each comprise an eccentric rotor member which is driven around a race formed in the oscillator housing. The oscillators are driven by means of electric motor 14, the output shaft of which is coupled to gear train 16. Drive shafts 18a and 18b of gear train 16 are coupled to the drive shafts 21a and 21b of the rotors of oscillators 12a and 12b, respectively, through spline couplings 19a and 19b, the spline couplings assuring sufficient play in the drive system to avoid undue strain thereon. Motor 14 and gear train 16 are supported on platform 20 which is attached to frame 24 by means of large elastic strips 22 which may be fabricated of heavy spring metal.

Oscillators 12a and 12b are tightly clamped to casing 11 by means of clamp member 25. The sonic energy generated by oscillators 12a and 12b is transferred to casing 11, and such energy effectively fluidizes earthen material 13 to enable the penetration of the casing therein.

Referring now to FIGS. 3–6, one embodiment of the oscillator mechanism of the device of the invention having applicant's unique gear engagement guide mechanism incorporated therein is illustrated. Rotor drive member 30 is rotatably mounted on bearings 31 and 32 and is rotatably driven on such bearings by means of shaft 21b, which as noted in connection with FIGS. 1 and 2 is rotatably driven by motor 14. Shaft 21b is attached to splined member 35 which engages splined portion 36 of rotor drive 30. Rotor drive 30 has a gear ring 30a attached thereto which engages a mating gear ring 40a attached to rotor 40. Rotor 40 has gear rings 40b and 40d thereon which in turn engage gear rings 42b and 42d, respectively. The inner wall of oscillator housing 42 forms the race in which the outer wall of rotor 40 rolls. Rotor 40 has weight members 40e attached thereto to enhance the vibrational output of the oscillator.

When shaft 21b is rotationally driven to cause rotation of rotor drive 30, gear 30a drives gear 40a to cause the rotor to ride around in the housing race, with gear rings 40b and 40d engaging gear rings 42b and 42d, respectively. With the rotor up to speed, the centrifugal force generated by its rotation keeps the rotor riding around the housing race with the associated gears in proper engagement with each other. However, in the absence of the guide mechanism of the device of this invention, such gear engagement can not be maintained when the rotor is rotating at a relatively slow speed as in starting up and stopping. Under such conditions, the force of gravity will tend to drop the rotor gear teeth out of engagement with the housing gear teeth. Such disengagement is prevented by means of pin members 50 which are attached to and extend from the opposite ends of rotor 40, operating in conjunction with scalloped annular members 52 attached to the inner wall of housing 42. Pin members 50 are evenly spaced to form rings around the ends of rotor 40 and there is one less pin member than there are scallops in annular members 52.

Referring now to FIGS. 7a–7c and 8a–8c, the operation of the pin members 50 in conjunction with the scalloped annular members 52 in guiding the engagement of the gears is illustrated. The positions of the pin members as shown in FIGS. 7a–7c correspond to the gear positions illustrated in FIGS. 8a–8c, respectively. In FIGS. 7a and 8a, the rotor is shown in the left-hand position of its rotation cycle. As can be seen, the gears are maintained in engagement by virtue of the right-hand pin members 50 riding on the crest of the right-hand portion of the scalloped member with the left-hand pin members falling into the nodes of the scalloped portion. In FIGS. 7b and 8b, the rotor is shown ninety degrees further on in the rotation cycle in its "up" position. Here, it can be seen that gear engagement is maintained by virtue of the lowermost pin members 50 riding on one of the lowermost crests of the scalloped member with the upper pin members riding in the upper nodes of such member. Finally, FIGS. 7c and 8c illustrate the situation ninety degrees later in the rotation cycle whereby gear engagement is maintained by virtue of the left-hand pin members 50 riding on the left-hand crests of the scalloped member while the right-hand pin members fall within right-hand node portions thereof. Thus it can be seen that gear engagement is positively maintained throughout the rotation cycle regardless of the speed of rotation of the rotor.

It is to be noted that it is preferable to allow some clearance or play between pin members 50 and scalloped member 52 so that when the rotor is rotating at its normal operational speed there will be minimal contact between the pin members and the scalloped members so as to minimize frictional engagement therebetween.

It is also to be noted that while in the illustrated embodiment of the device of the invention the pin members 50 are shown on the rotor member and the scalloped member on the housing, the device of the invention can be implemented to equal advantage by placing the annular scalloped member on the rotor with the pin members projecting from the housing.

The device of this invention thus provides simple yet highly effective means for assuring positive gear engagement of a gear-type orbiting-mass oscillator when the rotor of such oscillator is running at low speeds such as in starting up and stopping. This end result is achieved without appreciable modification to pre-existing structures and without any sacrifice in the efficiency of the operation of the oscillator.

While the device of the invention has been described and illustrated in detail, it is to be clearly understood that this is intended by way of illustration and example only, the spirit and scope of this invention being limited only by the terms of the followng claims:

I claim:
1. An orbiting-mass oscillator for generating sonic vibrational energy, comprising:
   a housing member having a circular bearing race formed in the inner walls thereof, a gear ring, said gear ring being mounted in said bearing race;
   a rotor member contained in said housing, said rotor forming a substantially cylindrical roller adapted to roll around on said bearing race, the diameter of said cylindrical roller being substantially less than the diameter of said bearing race, a circular gear ring running around the periphery of said roller, said gear ring being adapted to matingly engage the gear ring mounted in said bearing race;
   drive means for causing said rotor to roll around on said race; and
   guide means for holding the gear teeth of said gear rings in engagement with each other, said guide means comprising:
   a plurality of spaced pin elements extending from one of said members along axes substantially parallel to the rotation axis of said rotor member, said pin elements being arranged in a circle; and
   an annular structure having a plurality of scalloped segments formed therein attached to the other of said members, said segments forming a ring and being positioned to engage said pin elements, there being one less of said pin elements than of said segments,
   whereby said pin elements slidably engage said segments as said rotor is rotated to hold said rotor with the gear teeth of said gear rings in engagement with each other at all times.

2. The oscillator as recited in claim 1, wherein said pin elements are attached to said rotor member and said annular structure is attached to said housing member.

3. The oscillator as recited in claim 2, wherein said pin elements extend from the opposite ends of said rotor member.

4. The oscillator as recited in claim 1, wherein said rotor drive means comprises a drive member, bearing means for supporting said drive member in the center of said housing member for rotation about the longitudinal axis of said housing member, said drive member having a gear ring running around the periphery thereof, said roller having a gear ring which matingly engages the gear ring of said drive member, and means for rotatably driving said drive member whereby said roller is driven around said drive member by virtue of the engagement of said gear rings.

5. The oscillator as recited in claim 4, wherein said means for driving said drive member comprises a motor and spline means for coupling the output drive of said motor to said drive member to provide play therebetween.

6. In a gear-type orbiting-mass oscillator for generating sonic vibrations, said oscillator including a housing member having a geared circular bearing race formed therein and a roller member contained in said housing member for rotation in said race, said roller member having a gear ring thereon for engaging the geared portion of said bearing race, guide means for holding the teeth of the gears in engagement with each other at all times, comprising:
   a plurality of spaced pin elements extending from at least one end of said roller member along axes substantially parallel to the rotation axis of said roller, said pin elements being arranged in a ring; and
   annular structure means attached to said housing member, said annular structure means comprising scalloped segments, said segments forming a ring and being positioned to engage said pin elements, there being one less of said pin elements than said segments,
   whereby said pin elements slidably engage said segments as said rotor is rotated to hold the gear teeth of the gears in engagement with each other at all times.

7. The oscillator as recited in claim 6 wherein said pin elements extend from opposite ends of said roller member to form rings thereat and wherein said annular structure means comprises a similar annular structure near each end of said housing member, positioned to engage associated groups of said pin elements.

References Cited
UNITED STATES PATENTS
3,283,598   11/1966   Barnes _____ 74—87

MILTON KAUFMAN, *Primary Examiner.*